United States Patent [19]

Jennings, Jr.

[11] Patent Number: 4,883,124
[45] Date of Patent: Nov. 28, 1989

[54] METHOD OF ENHANCING HYDROCARBON PRODUCTION IN A HORIZONTAL WELLBORE IN A CARBONATE FORMATION

[75] Inventor: Alfred R. Jennings, Jr., Plano, Tex.
[73] Assignee: Mobil Oil Corporation, New York, N.Y.
[21] Appl. No.: 281,170
[22] Filed: Dec. 8, 1988
[51] Int. Cl.⁴ .............................................. E21B 43/27
[52] U.S. Cl. ...................................... 166/307; 166/50
[58] Field of Search ................ 166/50, 266, 267, 271, 166/307, 305.1

[56] References Cited

U.S. PATENT DOCUMENTS

| | | | |
|---|---|---|---|
| Re. 30,484 | 1/1981 | Broaddus et al. | 166/307 |
| 2,171,416 | 8/1939 | Lee | 166/50 X |
| 3,233,672 | 2/1966 | Carpenter | 166/307 |
| 3,319,714 | 5/1967 | Knox | 166/307 |
| 3,734,186 | 5/1973 | Williams | 166/307 X |
| 3,918,524 | 11/1975 | Broaddus et al. | 166/307 |
| 4,630,679 | 12/1986 | Reeves, III et al. | 166/305.1 |

Primary Examiner—George A. Suchfield
Attorney, Agent, or Firm—Alexander J. McKillop; Charles J. Speciale; Charles A. Malone

[57] ABSTRACT

A two-step process to stimulate a horizontal wellbore drilled into a carbonate formation. Initially, the wellbore is filled with acid. Because vertical communication exists in the vicinity of the wellbore, the acid enters into the fissures and cracks from the wellbore. Thereafter, a non-reactive displacement fluid, having a density greater than the acid, is injected into the wellbore. This more dense displacement fluid pushes the acid to greater depths into the formation so carbonate dissolution can take place which substantially increases the formation's permeability. Increased permeability enhances the production of hydrocarbonaceous fluids.

14 Claims, 1 Drawing Sheet

METHOD OF ENHANCING HYDROCARBON PRODUCTION IN A HORIZONTAL WELLBORE IN A CARBONATE FORMATION

FIELD OF THE INVENTION

This invention is directed to a method for improved acidizing of a carbonate formation which contains a horizontal wellbore. More particularly, it is directed to the use of an inorganic acid to contact the formation which contact is enhanced by the use of a displacement fluid of a higher density.

BACKGROUND OF THE INVENTION

It is a common practice to acidize subterranean formations in order to increase the permeability thereof. For example, in the petroleum industry, it is conventional to inject an acidizing fluid into a well in order to increase the permeability of a surrounding hydrocarbon-bearing formation and thus facilitate the flow of hydrocarbonaceous fluids into the well from the formation or the injection of fluids, such as gas or water, from the well into the formation. Such acidizing techniques may be carried out as "matrix acidizing" procedures or as "acid-fracturing" procedures.

In matrix acidizing, the acidizing fluid is passed into the formation from the well at a pressure below the breakdown pressure of the formation. In this case, increase in permeability is effected primarily by the chemical reaction of the acid within the formation with little or no permeability increase being due to mechanical disruptions within the formation as in fracturing.

In most cases, acidizing procedures are carried out in calcareous formations such as dolomites, limestones, dolomitic sandstones, etc. One difficulty encountered in the acidizing of such a formation is presented by the rapid reaction rate of the acidizing fluid with those portions of the formation with which it first comes into contact. This is particularly serious in matrix acidizing procedures. As the acidizing fluid is forced from the well into the formation, the acid reacts rapidly with the calcareous material immediately adjacent to the well. Thus, the acid becomes spent before it penetrates into the formation a significant distance from the well. For example, in matrix acidizing of a limestone formation, it is common to achieve maximum penetration with a live acid to a depth of only a few inches to a foot from the face of the wellbore. This, of course, severely limits the increase in productivity or injectivity of the well.

In order to increase the penetration depth, it has heretofore been proposed to add a reaction inhibitor to the acidizing fluid. For example, in U.S. Pat. No. 3,233,672 issued to N. F. Carpenter, there is disclosed an acidizing process in which inhibitor, such as alkyl-substituted carboximides and alkyl-substituted sulfoxides, is added to the acidizing solution. Another technique for increasing the penetration depth of an acidizing solution is that disclosed by U.S. Pat. No. 3,076,762 issued to W. R. Dill, wherein solid, liquid, or gaseous carbon dioxide is introduced into the formation in conjunction with the acidizing solution. The carbon dioxide acts as a coolant, thus retarding the reaction rate of the acid with the formation carbonates. Also, the carbon dioxide is said to become solubilized in the acidizing solution, thus resulting in the production of carbonic acid which changes the equilibrium point of the acid-carbonate reaction to accomplish a retarding effect.

An additional procedure disclosed in U.S. Pat. No. 2,850,098 issued to Moll et al. involves the removal of contaminants from a water well and the adjacent formation through the injection of gaseous hydrogen chloride. Still another technique for acidizing a calcareous formation is disclosed in U.S. Pat. No. 3,354,957 issued to Every et al. In this process liquid anhydrous hydrogen chloride is forced from a well into the adjacent formations. The liquid hydrogen chloride vaporizes within the formation and the resulting gas dissolves in the formation water to form hydrochloric acid which then attacks the formation.

The effectiveness of acidizing in removing wellbore damage and improving productivity in carbonate reservoirs is highly dependent upon acid reactivity and contact with the formation in the vicinity of the damage. If the pay zone is extensive (greater than 20 to 25 feet in thickness), diverting methods, such as ball sealers, benzoic acid flakes or paraffin beads, will be used to inject acid into the formation matrix over the entire interval. Where the total zone thickness is large (greater than about 25 feet), it is very difficult to effectively acidize the entire interval, even when diverting agents are used. Effective acidizing is even more difficult in horizontal wellbores.

With advances in drilling technology, it is currently possible to drill horizontal wellbores deep into hydrocarbon producing reservoirs. Utilization of horizontal wellbores allows extended contact with a producing formation, thereby facilitating drainage and production of the reservoir.

Although horizontal wellbores allow more contact with the producing formation, some difficulties are encountered when horizontal wellbores are utilized which are not commonly experienced when vertical wells are used. Methods used in producing hydrocarbons from a formation or reservoir via vertical wells often prove to be inefficient when attempting to remove hydrocarbons from a reservoir where horizontal wellbores are being used. This inefficiency results in utilization of increased amounts of fluids used during enhanced oil recovery operations. This results in a diminution in the amount of hydrocarbons removed from the formation or reservoir.

Therefore, what is needed is an efficient acidizing method which will allow acid to penetrate to substantially further distances in a carbonate formation wherein a horizontal wellbore is utilized.

SUMMARY

This invention is directed to a two-step process to stimulate a horizontal wellbore which is drilled into a carbonate formation containing hydrocarbonaceous fluids. In the practice of this invention, the horizontal wellbore is filled with an acid of a strength and composition sufficient to etch the carbonate formation. Acids which can be utilized include hydrochloric acid, formic acid, acetic acid and gelled acids.

After the acid has entered the formation to the extent desired, a displacement fluid, having a density greater than the acid which is first directed into the wellbore, is injected into the wellbore. Thereafter, pumping pressure is applied to the displacement fluid which causes the acid to be forced further into the formation thereby enhancing the penetration of the acid. The displacement fluid which is utilized should not react with the acid utilized. Non-reactive fluids which can be used herein comprise brine solutions and gelled fracturing fluids.

Once the acid solution becomes spent, it, along with the displacement fluid, is produced back to the surface. The cycle of injecting acid followed by a displacement fluid is repeated until the formation is etched to the extent that it is desired to stimulate the formation.

It is therefore an object of this invention to increase the vertical relative permeability of a formation in which a horizontal wellbore has been placed for the removal of hydrocarbonaceous fluids.

It is another object of this invention to use acid stimulation in a formation containing a horizontal wellbore so as to optimize reservoir drainage via gravity.

It is yet another object of this invention to provide for acid stimulation of a formation which stimulation can be used with any length of a horizontal wellbore.

It is a still yet further object of this invention to provide for an acid stimulation method which can enhance oil recovery via a horizontal wellbore particularly in reservoirs having a low bottom hole pressure.

It is an even yet further object of this invention to enhance the existing permeability of a carbonate formation in which vertical communication exists which communication is by natural fractures or artificially induced.

DESCRIPTION OF THE PREFERRED EMBODIMENTS

Figure 1:
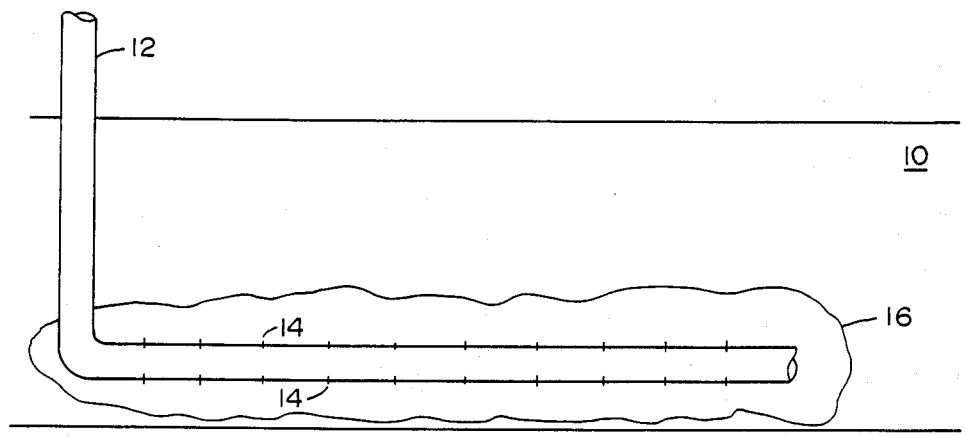
FIG. 1 is a schematic representation which depicts a horizontal wellbore in a formation subsequent to acid injection.

In the practice of this invention referring to FIG. 1, horizontal wellbore 12 containing perforations 14 has penetrated into formation 10. Formation 10 comprises substantially carbonate compounds and is highly permeable. Thus, vertical communication exists between formation 10 and perforations 14 contained in wellbore 12. The permeability may be natural or artificially induced by prior fracturing. Wellbore 12 is filled with an acid. This acid 16 flows from wellbore 12 into formation 10 via perforations 14. The injected acid will have a specific gravity of about 1.005 to about 1.15. The acid flows into formation 10 because of its high permeability. Additional wellbore volumes of acid can be used until the acid, preferably one with delayed carbonate activity, has penetrated into the formation.

Figure 2:
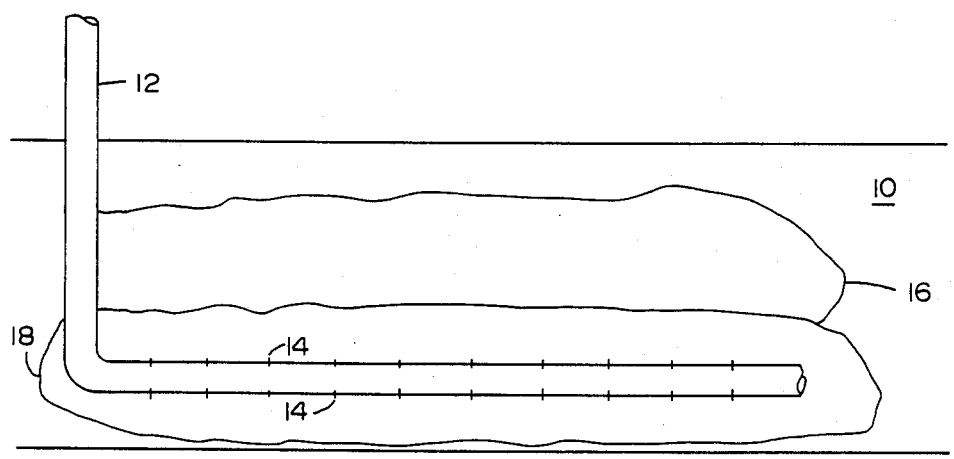
FIG. 2 is a schematic representation which depicts a formation containing acid followed by a denser displacement fluid which has been directed through a horizontal wellbore.

After sufficient acid has been placed into the formation 10 via wellbore 12, a non-reactive displacement fluid 18 is injected into formation 10 via wellbore 12. As shown in FIG. 2, displacement fluid 18 forces acid 16 away from wellbore 12. Displacement fluid 18 does not react with acid 16. Acid 16 being lighter than displacement fluid 18 will be displaced preferentially in an upward direction. Continued injection of heavier displacement fluid 18 into wellbore 12 causes acid 16 to migrate further into formation 10. Injection of displacement fluid 18 continues until the acid has been displaced the desired distance into formation 10. In this manner penetration of the acid into the formation is enhanced.

Once the acid is activated, it reacts with the carbonate formation and solubilizes carbonate compounds. This reaction continues until substantially all the acid is used up and becomes spent. After the acid is spent, injection is terminated. Thereafter, it and the injected displacement fluid 18 are produced back to the surface from wellbore 12. Subsequently, increased hydrocarbonaceous fluids will be observed to flow from formation 10 into wellbore 12 because of acid dissolution of the carbonate compounds. The process of acid placement and displacement fluid injection can be repeated until the desired permeability of formation 10 has been created. The solution of acid employed may be any of the aqueous solutions of acid commonly employed for acidizing subterranean calcareous formations. For example, the solution of acid may be an aqueous solution of hydrochloric acid. Commonly, the aqueous solutions of hydrochloric acid employed for acidizing subterranean calcareous formations contain between 5 and 28 percent by weight of hydrogen chloride. An aqueous solution of acetic acid may be also employed. Additionally, an aqueous solution of formic acid may be employed. As is known, when the acid solution becomes spent as the result of reacting with the material of the formation, the solubility of calcium sulfate, i.e., anhydrite or gypsum, dissolved in the acid decreases. Thus, any calcium sulfate dissolved from the formation or derived from the water employed in preparing the solution of acid can precipitate with a consequent decrease in the permeability of the formation.

Accordingly, it is preferred that the solution of acid that is employed contain an agent to inhibit the precipitation of calcium sulfate. Thus, where hydrogen chloride is employed, the solution thereof may contain up to 40 percent by weight of calcium chloride. Additionally, the solution of acid may also contain any of the commonly employed inhibitors for preventing corrosion of metal equipment, such as casing, liner, or tubing in the well.

The amount of solution of acid to be employed will vary according to the radial distance from the well to which the formation is to be acidized and, as stated, this distance may vary up to 15 feet but will not, in most cases, exceed about 10 feet from the well. The amount of solution of acid to be employed will also vary according to the extent to which the material of the formation is to be dissolved. Preferably, the amount of acid should be one hydrocarbon pore volume of the portion of the formation to be acidized. However, lesser amounts may be employed. Generally, the amount employed will be that ordinarily employed in conventional, commercial acidizing operations.

Also, as disclosed in U.S. Pat. No. 3,233,672 issued to Carpenter, inhibitors, such as alkyl-substituted carboximides and alkyl-substituted sulfoxides, can be added to the acidizing solution. This patent is hereby incorporated by reference.

A higher density or higher specific gravity displacement fluid which may be used herein includes salts of alkali or alkaline-earth metals in aqueous solutions and mixtures thereof. Zinc chloride solutions may also be used. Listed below are some minimally required high density or high specific gravity solutions which can be used as a displacement fluid. The displacement fluid should have a specific gravity of at least 0.1 greater than the specific gravity of the acid solution. Although sodium chloride, potassium chloride, calcium chloride, and zinc chloride are mentioned in Table I, bromides of these salts may also be utilized. The specific gravity of the acid solution can range from about 1.05 to about 1.10 at room temperature.

TABLE I

Examples of High Density Fluids

| Fluid | Concentration By Weight (%) | Specific Gravity @ 20° C. | Density Pounds Per Gallon @ 20° C. |
|---|---|---|---|
| NaCl | 8 | 1.0590 | 8.82 |
| NaCl | 12 | 1.0894 | 9.07 |
| NaCl | 26 (sat.) | 1.2025 | 10.02 |
| KCl | 8 | 1.0500 | 8.75 |
| KCl | 12 | 1.0768 | 8.97 |
| KCl | 24 (sat.) | 1.1623 | 9.68 |
| CaCl$_2$ | 8 | 1.0659 | 8.88 |
| CaCl$_2$ | 12 | 1.1015 | 9.18 |
| CaCl$_2$ | 40 (sat.) | 1.3957 | 11.63 |
| ZnCl$_2$ | 8 | 1.0715 | 8.93 |
| ZnCl$_2$ | 12 | 1.1085 | 9.23 |
| ZnCl$_2$ | 70 (sat.) | 1.9620 | 16.34 |

Once a cycle of acid and a displacement fluid has been moved through the formation and removed therefrom, the cycle can be repeated until the formation has obtained the degree of permeability desired to remove additional hydrocarbonaceous fluids from the formation. A miscible displacement procedure using a water bank is disclosed in U.S. Pat. No. 3,270,809 which issued to Connally, Jr. et al. on Sept. 6, 1966. This patent is hereby incorporated in its entirety herein. The teachings of these procedures can be used in combination with this invention to place the fluids into the formation. Of course, as disclosed herein, horizontal wellbores must be used as taught along with the acid and displacement fluid mentioned herein.

Obviously, many other variations and modifications of this invention as previously set forth may be made without departing from the spirit and scope of this invention as those skilled in the art readily understand. Such variations and modifications are considered part of this invention and within the purview and scope of the appended claims.

What is claimed is:

1. An acid stimulation method for increasing the permeability of a carbonate formation where a horizontal wellbore is used to produce hydrocarbonaceous fluids therefrom comprising:
    (a) filling said horizontal wellbore with a solution of a predetermined specific gravity containing one acid and an agent to inhibit the precipitation of calcium sulfate which solution enters said formation via cracks or fissures communicating with said wellbore;
    (b) injecting into said wellbore a displacement fluid of a specific gravity greater than said acid solution which fluid displaces the acid substantially further into the formation; and thereafter
    (c) allowing said acid to remain in contact with said formation for a time sufficient to solubilize compounds therein so as to cause the formation to become substantially more permeable.

2. The method as recited in claim 1 where said acid has a specific gravity of about 1.005 to about 1.15.

3. The method as recited in claim 1 where said displacement fluid has a specific gravity of at least 0.10 greater than said acid.

4. The method as recited in claim 1 where the acid is an inhibited acid which comprises acetic acid, hydrochloric acid, or formic acid.

5. The method as recited in claim 1 where after step (c) spent acid and displacement fluid is removed from the formation prior to producing hydrocarbonaceous fluids therefrom.

6. The method as recited in claim 1 where said second fluid is a member selected from the group consisting of aqueous solutions of potassium chloride, sodium chloride, calcium chloride, zinc chloride, potassium bromide, sodium bromide, calcium bromide, zinc bromide, and mixtures thereof.

7. An acid stimulation method for increasing the permeability of a carbonate formation where a horizontal wellbore is used to produce hydrocarbonaceous fluids therefrom comprising:
    (a) filling said horizontal wellbore with an acid solution of a predetermined specific gravity containing one acid and an agent to inhibit the precipitation of calcium sulfate which solution enters said formation via cracks or fissures communicating with said wellbore;
    (b) injecting into said wellbore a displacement fluid of a specific gravity greater than said acid solution which fluid displaces the acid substantially further into the formation;
    (c) allowing said acid to remain in contact with said formation for a time sufficient to solubilize compounds therein so as to cause the formation to becomes substantially more permeable; and
    (d) removing spent acid and the displacement fluid from said formation through said wellbore.

8. The method as recited in claim 7 where said acid has a specific gravity of about 1.005 to about 1.15.

9. The method as recited in claim 7 where said displacement fluid has a specific gravity of at least 0.10 greater than said acid.

10. The method as recited in claim 7 where the acid is an inhibited acid which comprises acetic acid, hydrochloric acid, or formic acid.

11. The method as recited in claim 7 where said second fluid is a member selected from the group consisting of aqueous solutions of potassium chloride, sodium chloride, calcium chloride, zinc chloride, potassium bromide, sodium bromide, calcium bromide, zinc bromide, and mixtures thereof.

12. The method as recited in claim 7 where steps (a) through (d) are repeated until the formation's permeability has been enhanced to the desired extent and hydrocarbonaceous fluids are produced from said formation.

13. An acid stimulation method for increasing the permeability of a carbonate formation where a horizontal wellbore is used to produce hydrocarbonaceous fluids therefrom comprising:
    (a) filling said horizontal wellbore with an inhibited aqueous acid solution having a specific gravity of about 1.05 to about 1.10 which acid comprises formic acid, acetic acid, and hydrochloric acid containing an agent to inhibit the precipitation of calcium sulfate;
    (b) injecting into said wellbore a displacement fluid having a specific gravity of about 1.10 greater than said acid solution which fluid displaces the acid substantially further into the formation which fluid is a member selected from the group consisting of aqueous solutions of potassium chloride, sodium chloride, calcium chloride, zinc chloride, potassium bromide, sodium bromide, calcium bromide, zinc bromide and mixtures thereof;
    (c) allowing said acid to remain in contact with said formation for a time sufficient to solubilize compounds therein so as to cause the formation to becomes substantially more permeable; and (d) removing spent acid and the displacement fluid from said formation through said wellbore.

14. The method as recited in claim 13 where steps (a) through (d) are repeated until the formation's permeability has been enhanced to the desired extent and hydrocarbonaceous fluids are produced from said formation.

* * * * *